Patented Mar. 2, 1943

2,312,674

UNITED STATES PATENT OFFICE 2,312,674

METHOD OF PREPARING BITUMINOUS PAVING MIXTURES

Joseph C. Roediger, Staten Island, N. Y., assignor to Standard Oil Development Company, a corporation of Delaware No Drawing. Application August 10, 1937, Serial No. 158,351

5 Claims. (Cl. 106—269).

This invention relates to a method of treating mineral aggregate, particularly mineral aggregate that is bonded by the use of a bituminous composition and used in paving.

It is well known that in the case of hydrophilic (acidic) aggregates, such as quartzite, traprock, etc., the adhesion of bitumen or oil coatings applied to these aggregates is noticeably poorer as regards water resistance, i. e., displacement of the bitumen by water, than the adhesivity of the same coating material to more hydrophobic (alkaline) aggregates, such as limestone, marble, etc. Even where hydrophobic aggregates are used, the bitumen or oil coating is at times not completely resistant to displacement by water.

An object of this invention is to improve the adhesivity of the bitumen or oil (resistance to displacement of the bitumen or oil by water) for all types of aggregates.

According to this invention the adhesivity of bitumen or oil to a mineral aggregate can be appreciably improved by first treating the mineral aggregate with water solutions of poly-valent metal salts so that poly-valent salt, or polyvalent metal ions are present on the surface of the mineral aggregate. From 0.01% to 0.10% or higher of the poly-valent metal salts may be used dependent upon the grading and surface area of the aggregate being treated. To this coated mineral aggregate is then added bitumen or oil in a fluid state containing a small amount of a natural or specially prepared reacting agent.

The theory is advanced that the poly-valent metal salt on an aggregate reacts with the reacting agent in the bitumen so as to produce, in situ, a metal soap directly at the interface with the mineral aggregate. The reacting agent used in the bitumen or oil may be the naturally existing organic acids or saturated or unsaturated fatty acid, or oils containing fatty acids in free or combined state, or sulfonated castor oil, or naphthenic acid, or sulfonated naphthenic acid obtained by the sulfuric acid treatment of petroleum oils. From 0.5% to 5% or higher of the reacting agent may be used.

This method permits the use of metal soaps that are relatively oil insoluble by their formation in situ. The metal soaps are formed on the surface of the aggregate, and even though they may be insoluble in the oil or bitumen, improve the adhesivity of the bitumen or oil in the mineral aggregate.

Where mineral aggregates contain large amounts of clay with properties similar to that of bentonite, the addition of the metal salt solution results in an absorption of the metal salt by the aggregate and also in a reaction between the strongly hydrophilic constituents of the clay and the poly valent metal salt resulting in the formation of less hydrophilic clay bodies which also have reduced water absorption and swelling tendencies. Two reactions occur when the mineral aggregate is first treated with a poly valent metal salt and mixed with a bitumen containing a reacting agent, first, the reaction as given above which produces a more insoluble and less absorptive clay, and second, a reaction of the remaining unreacted poly-valent salt with the reacting agent present in the bitumen or oil. A paving mixture of improved properties as regards low hydrating and swelling tendencies is thereby obtained together with improved adhesivity of the oil or bitumen with the mineral aggregate. Where a poly-valent salt is added to a mineral aggregate of this type, sufficient quantities should be used to permit both reactions to occur.

For example, by the ability of a mineral oil wetting a mineral aggregate, the improvement obtained in using the poly-valent salt and the reacting agent is shown. One gram of a mineral aggregate passing 325 mesh is mixed with 7 cc. of an aqueous metal salt solution. To this mixture is then added 7 cc. of a mineral white lubricating oil containing a reacting agent in 2.5% concentration based on the mineral white lubricating oil. The mixture is thoroughly shaken and the amount of mineral aggregate wet by the oil in this case is compared to the amount wet by the oil when the mineral aggregate was treated similarly, except that the water contained no metal salt in solution. For example, using lead chloride in a 1% water solution as the metal salt and a naphthenic acid as the agent in the oil, 90% of the mineral aggregate was wet by the oil, whereas a mineral aggregate shaken with water (without any lead chloride in the water) and a mineral white lubricating oil with naphthenic acid in solution, 10% of the mineral aggregate was wet by the oil.

The following table discloses the improvement in adhesivity obtained by using various salts on the mineral aggregate:

*Effect on adhesivity of trap rock pretreated with 0.1% salt and mixed with treated asphalt containing various fatty acids—Venezuelan binder C asphalt used*

| Adhesivity test employed | Aggregate treated with 0.1% of— | | | |
|---|---|---|---|---|
| | No treatment | | Lead nitrate | |
| | Displacement | Boiling 1 min. | Displacement | Boiling 1 min. |
| Agent in cut back—2.5% on asphalt: | | | | |
| Untreated | 20 | 0/5 | 30 | 10/20 |
| Ricinoleic acid | 20 | 20 | 80/90 | 70 |
| Lard oil fatty acids | 30/40 | 5/10 | 70 | 80 |
| Stearic acid | 40/50 | 10/20 | 95/100 | 40/50 |
| Oleic acid | 20/30 | 10/20 | 70/80 | 80/90 |

| Adhesivity test employed | Aggregate treated with 1% of— | | | | | |
|---|---|---|---|---|---|---|
| | Barium chloride | | Mag. chloride | | Calcium chloride | |
| | Displacement | Boiling 1 min. | Displacement | Boiling 1 min. | Displacement | Boiling 1 min. |
| Untreated | 10/20 | 0/5 | 10/20 | 0/5 | 10/20 | 0/5 |
| Ricinoleic acid | 60/70 | 25/30 | 20/30 | 10/20 | 30/40 | 10/20 |
| Lard oil fatty acids | 30/40 | 10/20 | 20/30 | 20/30 | 30/40 | 20/30 |
| Stearic acid | 90 | 10 | 80/90 | 10/20 | 80/90 | 20/30 |
| Oleic acid | 80/90 | 60/70 | 75 | 70/80 | 40/50 | 50/60 |

The effects of various amounts of lead salt on the adhesivity is illustrated in the following table:

*Effect of amount of lead salt pretreatment on asphalt adhesivity*

| Agent in cutback—2.5% on asphalt | Per cent lead nitrate on aggregate adhesivity test employed | | | |
|---|---|---|---|---|
| | 0.0 | | 0.025 | |
| | Displacement | Boiling 1 min. | Displacement | Boiling 1 min. |
| Untreated | 20 | 0/5 | | |
| Lard oil fatty acids | 30/40 | 5/10 | 80/90 | 60/70 |
| Ricinoleic acid | 20 | 20 | 80/90 | 70/80 |
| Fatty acids of oxid. paraffin wax | 30/40 | 20/30 | 60/70 | 60/70 |
| Naphthenic acid | 0/10 | 0/5 | 50 | 40/50 |
| Oleic acid | 20/30 | 10/20 | 70 | 80 |

| Agent in cutback—2.5% on asphalt | Per cent lead nitrate on aggregate adhesivity test employed | | | |
|---|---|---|---|---|
| | 0.05 | | 0.10 | |
| | Displacement | Boiling 1 min. | Displacement | Boiling 1 min. |
| Untreated | | | 30 | 10/20 |
| Lard oil fatty acids | 80/90 | 80/90 | 80 | 80/90 |
| Ricinoleic acid | 80/90 | 80/90 | 90 | 80 |
| Fatty acids of oxid. paraffin wax | 60/70 | 70 | 60/70 | 60/70 |
| Naphthenic acid | 60/70 | 50/60 | 70/80 | 70/80 |
| Oleic acid | 80 | 80 | 80 | 80 |

The water displacement test is as follows: Mineral aggregate of ¼" to 10 mesh aggregate is coated with 2½% of the bituminous composition in the form of a rapid curing cutback containing 67% asphalt. After coating, the aggregate is spread out and cured for 1 hour at room temperature and is then completely covered with the distilled water for 18 hours at room temperature. At the end of this period and while submerged, a preliminary estimation is made of the per cent of the aggregate surface still coated with asphalt. The aggregate still submerged in water is cooled to 40° F. for at least one hour after which the cold water is drained off, the aggregate spread out on a can cover and placed under an electric fan for rapid drying. After approximately 30 minutes the surface of the aggregate is sufficiently dry to permit a final evaluation of the percentage of aggregate surface still coated with asphalt. Different operators have been able to agree on the readings within 10% generally.

The water boiling test measures the resistance of an asphalt coating to displacement by water at its boiling point and consists in boiling the coated aggregate (which has been cured for two days at 140° F.) in distilled water for one minute, and an estimation is then made of the per cent of the aggregate surface still coated with asphalt.

It is not the intention to limit our invention to the examples or theories advanced which are given to illustrate the various improvements obtained in the art, but it is the intention to claim the invention as broadly as the prior art permits.

I claim:

1. A process of preparing a paving mixture which comprises coating a mineral aggregate with an aqueous solution of a water-soluble lead salt and then adding to the coated mineral aggregate a bitumen in a fluid state containing a minor proportion of fatty acid.

2. A process of preparing a paving mixture according to claim 1 in which water-soluble lead salt is lead nitrate.

3. A process of preparing a bituminous paving mixture which comprises coating a mineral aggregate with an aqueous solution of a polyvalent metal salt and to this coated mineral aggregate adding a bitumen in a fluid state containing a small proportion of a fatty acid which will react with the polyvalent metal salt.

4. The process of preparing a bituminous paving mixture according to claim 3 in which the acid is oleic acid.

5. The process of preparing a bituminous paving mixture according to claim 3 in which the acid is naphthenic acid.

JOSEPH C. ROEDIGER.